United States Patent
Kanai et al.

(10) Patent No.: US 11,892,905 B2
(45) Date of Patent: Feb. 6, 2024

(54) ABNORMALITY HANDLING SUPPORT APPARATUS, METHOD, AND PROGRAM

(71) Applicant: Nippon Telegraph and Telephone Corporation, Tokyo (JP)

(72) Inventors: Shunsuke Kanai, Musashino (JP); Satoshi Suzuki, Musashino (JP); Haruhisa Nozue, Musashino (JP); Naomi Murata, Musashino (JP); Fumika Asai, Musashino (JP); Kazuaki Akashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 136 days.

(21) Appl. No.: 17/762,474

(22) PCT Filed: Sep. 26, 2019

(86) PCT No.: PCT/JP2019/037965
§ 371 (c)(1),
(2) Date: Mar. 22, 2022

(87) PCT Pub. No.: WO2021/059451
PCT Pub. Date: Apr. 1, 2021

(65) Prior Publication Data
US 2022/0342746 A1 Oct. 27, 2022

(51) Int. Cl.
*G06F 11/07* (2006.01)
*G06F 18/10* (2023.01)
(Continued)

(52) U.S. Cl.
CPC .......... *G06F 11/0793* (2013.01); *G06F 18/10* (2023.01); *G06F 18/22* (2023.01); *G06N 7/01* (2023.01)

(58) Field of Classification Search
CPC ........ G06F 11/07; G06F 11/0793; G06N 7/01
See application file for complete search history.

(56) References Cited

U.S. PATENT DOCUMENTS

2004/0225475 A1* 11/2004 Johnson ............. G05B 23/0278
 702/185
2005/0015217 A1* 1/2005 Weidl ..................... G05B 17/02
 702/185
(Continued)

FOREIGN PATENT DOCUMENTS

JP 2018028778 2/2018

*Primary Examiner* — Kamini B Patel
(74) *Attorney, Agent, or Firm* — Fish & Richardson P.C.

(57) ABSTRACT

In an embodiment of the present invention, a memory stores case performances on anomaly handling of a plurality of apparatuses. A hardware processor performs: identification processing of identifying an anomaly cause of an abnormal apparatus in the plurality of apparatuses; selection processing of selecting an estimation model for estimating a handling method suitable for the anomaly cause from a plurality of estimation models based on the case performance of the abnormal apparatus; estimation processing of estimating a handling method suitable for the anomaly cause among a plurality of handling methods based on the selected estimation model; and output processing of outputting information indicating the estimated handling method.

15 Claims, 13 Drawing Sheets

(51) Int. Cl.
  *G06F 18/22* (2023.01)
  *G06N 7/01* (2023.01)

(56) References Cited

U.S. PATENT DOCUMENTS

| | | | |
|---|---|---|---|
| 2005/0043922 A1* | 2/2005 | Weidl | G06N 7/01 |
| | | | 702/183 |
| 2017/0279687 A1* | 9/2017 | Muntés-Mulero | H04L 41/065 |
| 2021/0405610 A1* | 12/2021 | Uchida | G05B 19/4063 |
| 2022/0163246 A1* | 5/2022 | Uchida | G05B 23/0283 |
| 2023/0080981 A1* | 3/2023 | Grueneberg | G06F 16/337 |
| | | | 705/7.14 |

* cited by examiner

Fig. 2

■PROBABILITY EXAMPLE

| | | FREQUENCY ESTIMATION |
|---|---|---|
| POPULATION | CONSTANT | NUMBER OF CASES OF RESTORATION OF APPARATUS (EXAMPLE: WHEN HANDLING IS PERFORMED TEN TIMES, RESTORATION IS ACHIEVED 8 TIMES) |
| DATA | PROBABILITY VARIABLE | PROBABILITY OF RESTORATION BY HANDLING |
| PRIOR PROBABILITY USED OR NOT USED | | NOT USED |
| MERIT | | RELIABLE BECAUSE DATA IS TAKEN IN SITU |
| DEMERIT | | SMALL NUMBER OF TRIALS MAY RESULT IN EXTREME VALUE |

■CALCULATION METHOD OF FREQUENCY STATISTICS

| APPARATUS TYPE | ANOMALY CAUSE | HANDLING | NUMBER OF CASES OF RESTORATION | FREQUENCY STATISTICS | |
|---|---|---|---|---|---|
| | | | | PROBABILITY | PRIORITY |
| ROUTER | ANOMALY CAUSE 1 | HANDLING A1 | 5 | 38% | 1 |
| | | HANDLING A2 | 4 | 31% | 2 |
| | | HANDLING A3 | 3 | 23% | 3 |
| | | HANDLING A4 | 1 | 8% | 4 |
| | ANOMALY CAUSE 2 | HANDLING B1 | 0 | 0% | 2 |
| | | HANDLING B2 | 0 | 0% | 3 |
| | | HANDLING B3 | 0 | 0% | 4 |
| | | HANDLING B4 | 1 | 100% | 1 |
| SERVER | ANOMALY CAUSE 1 | HANDLING A1 | 0 | 0% | 4 |
| | | HANDLING A2 | 1 | 17% | 3 |
| | | HANDLING A3 | 2 | 33% | 2 |
| | | HANDLING A4 | 3 | 50% | 1 |
| | ANOMALY CAUSE 2 | HANDLING B1 | 8 | 73% | 1 |
| | | HANDLING B2 | 1 | 9% | 3 |
| | | HANDLING B3 | 2 | 18% | 2 |
| | | HANDLING B4 | 0 | 0% | 4 |

EX. ⬜ : PRIORITY OF HANDLING A1 IS "1" FOR ROUTER, BUT "4" FOR SERVER

EX. ⬜ : PRIORITY OF HANDLING B4 IS "1" FOR ROUTER, BUT "4" FOR SERVER

Fig. 3

CALCULATION METHOD OF BAYESIAN STATISTICS
■(PATTERN 1)

| APPARATUS TYPE | ANOMALY CAUSE | HANDLING | NUMBER OF CASES OF RESTO- RATION | BAYESIAN STATISTICS ||  |
|---|---|---|---|---|---|---|
| | | | | PROBABILITY | PRIORITY | |
| ROUTER | ANOMALY CAUSE 1 | HANDLING A1 | 5 | 26% | 1 | ⎫ |
| | | HANDLING A2 | 4 | 26% | 2 | ⎬ 100% |
| | | HANDLING A3 | 3 | 26% | 3 | |
| | | HANDLING A4 | 1 | 21% | 4 | ⎭ |
| | ANOMALY CAUSE 2 | HANDLING B1 | 0 | 67% | 1 | ⎫ |
| | | HANDLING B2 | 0 | 8% | 3 | ⎬ 100% |
| | | HANDLING B3 | 0 | 17% | 2 | |
| | | HANDLING B4 | 1 | 8% | 4 | ⎭ |
| SERVER | ANOMALY CAUSE 1 | HANDLING A1 | 0 | 26% | 1 | ⎫ |
| | | HANDLING A2 | 1 | 26% | 2 | ⎬ 100% |
| | | HANDLING A3 | 2 | 26% | 3 | |
| | | HANDLING A4 | 3 | 21% | 4 | ⎭ |
| | ANOMALY CAUSE 2 | HANDLING B1 | 8 | 67% | 1 | ⎫ |
| | | HANDLING B2 | 1 | 8% | 3 | ⎬ 100% |
| | | HANDLING B3 | 2 | 17% | 2 | |
| | | HANDLING B4 | 0 | 8% | 4 | ⎭ |

LEGEND
RESTORATION PROBABILITY OF HANDLING
$A_n$ OF ANOMALY CAUSE 1 =     $X_i$: ANOMALY CAUSE
$\sum_{n}^{4} P(A_n | X_1) = 100\%$     $A_n$: HANDLING A

 (EX.: PROBABILITY OF RESTORATION ACHIEVED BY HANDLING A1 OF ANOMALY CAUSE 1 =
$$\frac{5+0}{5+4+3+1+0+1+2+3} = 26\%$$

Fig. 4

CALCULATION METHOD OF BAYESIAN STATISTICS ■(PATTERN 2)

| APPARATUS TYPE | ANOMALY CAUSE | HANDLING | NUMBER OF CASES OF RESTO- RATION | BAYESIAN STATISTICS | |
|---|---|---|---|---|---|
| | | | | PROBABILITY | PRIORITY |
| ROUTER | ANOMALY CAUSE 1 | HANDLING A1 | 5 | 38% | 1 |
| | | HANDLING A2 | 4 | 31% | 2 |
| | | HANDLING A3 | 3 | 23% | 3 |
| | | HANDLING A4 | 1 | 8% | 4 |
| | ANOMALY CAUSE 2 | HANDLING B1 | 0 | 0% | 2 |
| | | HANDLING B2 | 0 | 0% | 3 |
| | | HANDLING B3 | 0 | 0% | 4 |
| | | HANDLING B4 | 1 | 100% | 1 |
| SERVER | ANOMALY CAUSE 1 | HANDLING A1 | 0 | 0% | 4 |
| | | HANDLING A2 | 1 | 17% | 3 |
| | | HANDLING A3 | 2 | 33% | 2 |
| | | HANDLING A4 | 3 | 50% | 1 |
| | ANOMALY CAUSE 2 | HANDLING B1 | 8 | 73% | 1 |
| | | HANDLING B2 | 1 | 9% | 3 |
| | | HANDLING B3 | 2 | 18% | 2 |
| | | HANDLING B4 | 0 | 0% | 4 |

(Each anomaly cause group sums to 100%)

LEGEND
RESTORATION PROBABILITY OF HANDLING $A_n$ OF ANOMALY CAUSE 1 OF ROUTER =
$$\Sigma_n^4 P(A_n|X_1,S_1)=100\%$$

$S_i$: NODE NUMBER
$X$: ANOMALY CAUSE
$A_n$: HANDLING A

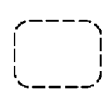
(EX.: PROBABILITY OF RESTORATION ACHIEVED BY HANDLING A1 OF ANOMALY CAUSE 1 =

$$\frac{5}{5+4+3+1} = 38\%)$$

Fig. 5

| APPARATUS TYPE | ANOMALY CAUSE | HANDLING | NUMBER OF CASES OF RESTORATION | HANDLING TIME PER CASE | FREQUENCY STATISTICS PRIORITY | BAYES (P1) PRIORITY | BAYES (P2) PRIORITY |
|---|---|---|---|---|---|---|---|
| ROUTER | ANOMALY CAUSE 1 | HANDLING A1 | 3 | 5 | 2 | 1 | 4 |
| | | HANDLING A2 | 3 | 10 | 3 | 2 | 1 |
| | | HANDLING A3 | 4 | 15 | 1 | 3 | 2 |
| | | HANDLING A4 | 0 | 20 | 4 | 4 | 3 |

Fig. 7

| APPARATUS TYPE | ANOMALY CAUSE | HANDLING | NUMBER OF CASES OF RESTORATION | HANDLING TIME PER CASE | FREQUENCY STATISTICS PRIORITY | BAYES (P1) PRIORITY | BAYES (P2) PRIORITY | CORRECT HANDLING |
|---|---|---|---|---|---|---|---|---|
| ROUTER | ANOMALY CAUSE 1 | HANDLING A1 | 3 | 5 | 2 | 1 | 4 | |
| | | HANDLING A2 | 3 | 10 | 3 | 2 | 1 | ● |
| | | HANDLING A3 | 4 | 15 | 1 | 3 | 2 | |
| | | HANDLING A4 | 0 | 20 | 4 | 4 | 3 | |
| NUMBER OF TIMES OF HANDLING UNTIL COMPLETION OF ORRECT HANDLING METHOD | | | | | THIRD TIME | SECOND TIME | FIRST TIME | |
| HANDLING TIME UNTIL COMPLETION OF CORRECT HANDLING METHOD | | | | | 20 MINUTES | 15 MINUTES | 10 MINUTES | |

| APPARATUS TYPE | ANOMALY CAUSE | HANDLING | NUMBER OF CASES OF RESTORATION | HANDLING TIME PER CASE | FREQUENCY STATISTICS PRIORITY | BAYES (P1) PRIORITY | BAYES (P2) PRIORITY |
|---|---|---|---|---|---|---|---|
| ROUTER | ANOMALY CAUSE 1 | HANDLING A1 | 3 | 5 | 2→3 | 1→2 | 4 |
| | | HANDLING A2 | 3→4 | 10 | 3→1 | 2→1 | 1 |
| | | HANDLING A3 | 4 | 15 | 1→2 | 3 | 2 |
| | | HANDLING A4 | 0 | 20 | 4 | 4 | 3 |

| | CASE WHERE BAYESIAN STATISTICS IS EFFECTIVE | CASE WHERE FREQUENCY STATISTICS IS EFFECTIVE | CASE WHERE BOTH APPROACHES ARE REQUIRED |
|---|---|---|---|
| TOPOLOGY CONFIGURATION | ROUTER 1 — ROUTER 2, SW1 SW2 SW3, SW1 SW2 SW3 | ROUTER 1 — ROUTER 2, SW1 SW2 SW3, SW1 SW2 SW3 | ROUTER — ROUTER 1 — ROUTER 2, ROUTER 1 — ROUTER 2, (multiple SW1 SW2 SW3 groups) |
| NUMBER OF CASES OF ANOMALY (PERFORMANCE) | 1 | 75 | 50 |
| APPARATUS TYPE | SMALL NUMBER | SMALL NUMBER | LARGE NUMBER |
| NUMBER OF MEASUREMENTS OF EFFECT | 100 *FIRST TIME CANNOT BE MEASURED BECAUSE OF ABSENCE OF PERFORMANCE | | |
|   FREQUENCY STATISTICS | 0 | 99 | 50 |
|   BAYESIAN STATISTICS (P1) | 99 | 0 | 0 |
|   BAYESIAN STATISTICS (P2) | 0 | 0 | 49 |
| NUMBER OF APPROACH CHANGES | 0 TIMES | 0 TIMES | 8 TIMES |
| RUN TIME WHEN APPROACH IS CHANGED | — | — | 8 HOURS |

ABNORMALITY HANDLING SUPPORT APPARATUS, METHOD, AND PROGRAM

CROSS-REFERENCE TO RELATED APPLICATIONS

This application is a National Stage application under 35 U.S.C. § 371 of International Application No. PCT/JP2019/037965, having an International Filing Date of Sep. 26, 2019. The disclosure of the prior application is considered part of the disclosure of this application, and is incorporated in its entirety into this application.

TECHNICAL FIELD

One aspect of the present invention relates to an anomaly handling support apparatus, a method, and a program that assist in anomaly handling for an abnormal apparatus, for example.

BACKGROUND ART

There have been proposed various techniques that assist in restoration of an apparatus on a network. PTL 1 discloses a technique in which a unique combination of failure events is extracted for each failure case so as not to overlap with other failure cases registered in a failure case database, and the unique combination is used as a characteristic failure event to automatically create and modify a rule by which a failure factor location can be determined. A handling method for a failure of a target apparatus identified as a failure factor location is generally extracted in an order of priority based on occurrence frequencies of handling methods in the target apparatus in the past.

CITATION LIST

Patent Literature

PTL 1: JP 2018-28778 A

SUMMARY OF THE INVENTION

Technical Problem

However, a handling method presented based on the occurrence frequencies is likely to be inappropriate for a situation immediately after operation start of a topology, a situation immediately after a change has occurred in the topology, and the like. This is because the number of cases of handling for failures generated in the topology configuration of such a situation in the past is small. Thus, presentation of a false handling method leads to an increased time required for restoration and an increased maintenance operation due to an after-action review of the handling method.

The present invention has been made in view of the above circumstances, and is directed to provide a technique for estimating an appropriate anomaly handling method for an abnormal apparatus.

Means for Solving the Problem

One aspect of the present invention is an anomaly handling support apparatus including a memory and a hardware processor. The memory is configured to store case performances on anomaly handling of a plurality of apparatuses. The hardware processor is configured to perform: identification processing of identifying an anomaly cause of an abnormal apparatus in the plurality of apparatuses; selection processing of selecting an estimation model for estimating a handling method suitable for the anomaly cause from a plurality of estimation models based on a case performance of the abnormal apparatus; estimation processing of estimating a handling method suitable for the anomaly cause among a plurality of handling methods based on the selected estimation model; and output processing of outputting information indicating the estimated handling method.

Effects of the Invention

According to an aspect of the present invention, it is possible to assist in anomaly handling for an abnormal apparatus by estimating an appropriate anomaly handling method for the abnormal apparatus. This makes it possible to realize a reduction in time required for restoration of the abnormal apparatus and maintenance operation.

BRIEF DESCRIPTION OF DRAWINGS

FIG. 2 is a diagram illustrating an example of calculation of a restoration probability by frequency statistics used in the anomaly handling support apparatus according to the embodiment of the present invention.

FIG. 3 is a diagram illustrating an example of calculation of a restoration probability by Bayesian statistics used in the anomaly handling support apparatus according to the embodiment of the present invention.

FIG. 4 is a diagram illustrating another example of calculation of a restoration probability by Bayesian statistics used in the anomaly handling support apparatus according to the embodiment of the present invention.

FIG. 5 is a diagram illustrating an example of a case performance used in the anomaly handling support apparatus according to the embodiment of the present invention.

FIG. 7 is a diagram illustrating an example of selection of an estimation model using the case performance illustrated in FIG. 5.

FIG. 9 is a diagram illustrating an example of update of the case performance illustrated in FIG. 5.

FIG. 13 is a diagram illustrating statistical models employed in accordance with topology configurations.

DESCRIPTION OF EMBODIMENTS

Hereinafter, an embodiment of the present disclosure will be described in detail with reference to the drawings.

Embodiment

Configuration Example

Figure 1:
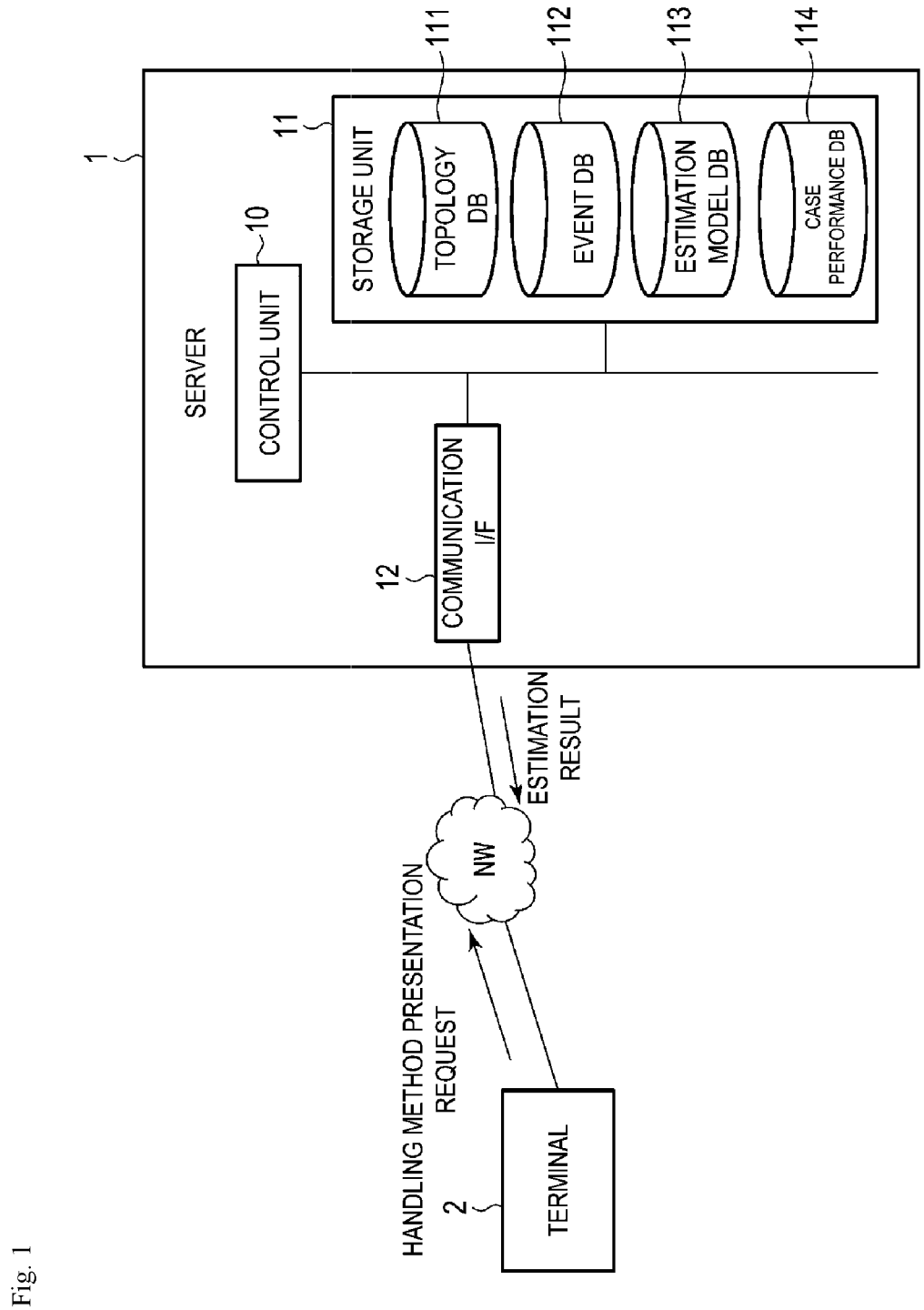
FIG. 1 is a block diagram illustrating a hardware configuration of a server used as an anomaly handling support apparatus according to an embodiment of the present invention.

FIG. 1 is a block diagram illustrating a hardware configuration of a server 1 used as an anomaly handling support apparatus.

The server 1 is an apparatus that transmits an estimation result including a handling method suitable for an abnormal apparatus to a terminal 2 in response to a presentation request of the handling method suitable for the abnormal apparatus included in a target network from the terminal 2. For example, the terminal 2 is a terminal used by an administrator of the target network. The abnormal apparatus is an apparatus in which an anomaly has occurred. The anomaly is a non-normal condition and includes a failure, a defect, a fault, and the like. In the following, the presentation request of the handling method is also referred to as a handling method presentation request.

The server 1 is composed of a computer that processes information. The server 1 includes a control unit 10, a storage unit 11, and a communication interface (I/F) 12. The control unit 10, the storage unit 11, and the communication I/F 12 are communicably connected to each other via a bus.

The control unit 10 controls the server 1. The control unit 10 includes a hardware processor such as a central processing unit (CPU).

The storage unit 11 is a storage medium. For example, the storage unit 11 is configured by combining, as a storage medium, a nonvolatile memory in which writing and reading can be performed any time, such as a hard disk drive (HDD) or a solid state drive (SSD), a nonvolatile memory such as a read only memory (ROM), and a volatile memory such as a random access memory (RAM). The storage unit 11 includes a program storage area and a data storage area in storage areas thereof. The program storage area stores application programs needed to perform various pieces of processing in addition to middleware such as an operating system (OS). The data storage area stores various data by a topology database (DB) 111, an event DB 112, an estimation model DB 113, and a case performance DB 114.

The topology DB 111 is a database that manages the topology of a plurality of apparatuses included in a target network. The plurality of apparatuses include various apparatuses such as a router and a server. The control unit 10 can update the topology DB 111 based on information on the topology, such as addition or removal of an apparatus in the target network. In the following, the information on the topology is also referred to as topology information. The control unit 10 may acquire the topology information based on input by the administrator in the terminal 2, and may acquire the topology information from the target network. The topology DB 111 may manage topologies of a plurality of target networks.

The event DB 112 is a database that manages anomalies that have occurred in the target network. The event DB 112 associates the plurality of apparatuses included in the target network with an anomaly history for management. The control unit 10 can update the plurality of apparatuses managed by the event DB 112 in response to update of the topology of the target network managed by the topology DB 111. The anomaly history is a history of anomalies that have occurred from the past to date. The anomaly history includes an anomaly cause per anomaly occurrence. In response to acquisition of information indicating an abnormal apparatus included in the target network and information indicating an anomaly cause of the abnormal apparatus, the control unit 10 can update the event DB 112. The control unit 10 may acquire information indicating an abnormal apparatus and information indicating an anomaly cause based on input by the administrator in the terminal 2. The control unit 10 may acquire information indicating an abnormal apparatus and information indicating an anomaly cause from the target network. The control unit 10 may estimate information indicating an abnormal apparatus and information indicating an anomaly cause based on various data sent from the target network. The event DB 112 may associate anomaly causes included in the anomaly history with handling methods that have contributed to restoration of abnormal apparatuses for management. The control unit 10 may acquire information indicating a handling method that has contributed to restoration of an abnormal apparatus based on input by the administrator in the terminal 2. The control unit 10 may acquire information indicating a handling method that has contributed to restoration of an abnormal apparatus from the target network.

The estimation model DB 113 is a database that manages a plurality of estimation models for estimating a handling method suitable for an anomaly cause of an abnormal apparatus from a plurality of handling methods. The plurality of estimation models include at least an estimation model related to the Bayesian statistics. Here, a description will be given assuming that the plurality of estimation models include an estimation model related to the frequency statistics and an estimation model related to the Bayesian statistics. Note that the plurality of estimation models may include one or more estimation models other than the estimation model related to the frequency statistics and the estimation model related to the Bayesian statistics. For example, the plurality of estimation models may include an estimation model related to a Markov chain Monte Carlo method, an estimation model related to a MAP estimation method, or the like. For example, the plurality of estimation models may include an estimation model built with another topology, or the like. The control unit 10 can update the plurality of estimation models managed by the event DB 112 based on acquisition of information indicating addition or removal of an estimation model. Examples of the estimation model related to the frequency statistics and the estimation model related to the Bayesian statistics will be described below.

The case performance DB 114 manages a case performance on anomaly handling of each of the plurality of apparatuses included in the target network. The case performance includes various pieces of information on handling for anomalies that have occurred from the past to date in the target network. The case performance is used to estimate a handling method suitable for an anomaly cause of an abnormal apparatus in which an anomaly is currently occurring. A configuration example of the case performance will be described below.

The communication I/F 12 enables communication between the server 1 and another apparatus over a network such as the Internet. The communication I/F 12 includes an interface corresponding to a standard such as a local area network (LAN). For example, the communication I/F 12 receives a handling method presentation request from the terminal 2 over the network. For example, the communication I/F 12 transmits an estimation result to the terminal over the network.

The estimation model related to the frequency statistics managed by the estimation model DB 113 will be described.

FIG. 2 is a diagram illustrating an example of calculation of a restoration probability by the frequency statistics. The restoration probability is a probability with which an abnormal apparatus in which an anomaly is currently occurring is estimated to be restored by application of a handling method. The frequency statistics is an approach that does not use a prior probability.

The control unit 10 uses data in which each of a plurality of handling methods is associated with the number of cases of restoration for each anomaly cause per apparatus type to determine the restoration probability for each of the plurality of handling methods by the frequency statistics. The number of cases of restoration is the number of cases, each of the cases being a case in which an abnormal apparatus has been restored by application of a handling method associated with the number of cases of restoration. For example, the control unit 10 determines the restoration probability for a handling A1 of an anomaly cause 1 of a router as (number of cases of restoration associated with handling A1 of anomaly cause 1 of router (5)/sum of the numbers of cases of restoration associated with handlings A1 to A4 of anomaly cause 1 of router (5+4+3+1)×100≈38%.

The control unit 10 determines a priority for each of the plurality of handling methods based on the restoration probability for each anomaly cause per apparatus type. For example, the control unit 10 determines priorities of the handlings A1 to A4 in descending order of restoration probability. The control unit 10 stores the priorities of the handlings A1 to A4 estimated in the estimation model related to the frequency statistics in the case performance DB 114.

The estimation model related to the Bayesian statistics managed by the estimation model DB 113 will be described.

FIG. 3 is a diagram illustrating an example of calculation of a restoration probability by the Bayesian statistics. The Bayesian statistics is an approach that uses a prior probability, unlike the frequency statistics.

The control unit 10 uses data in which each of a plurality of handling methods is associated with the number of cases of restoration for each anomaly cause per apparatus type to determine a restoration probability for each of the plurality of handling methods by the Bayesian statistics. In the example illustrated in FIG. 3, the control unit 10 does not consider the apparatus type, and determines the restoration probability of each of the plurality of handling methods for each anomaly cause. For example, as illustrated in FIG. 3, the control unit 10 commonly determines a restoration probability for the handling A1 of the anomaly cause 1 of a router and a restoration probability for the handling A1 of the anomaly cause 1 of a server. Thus, the restoration probability associated with the handling A1 of the anomaly cause 1 of the router is the same as the restoration probability associated with the handling A1 of the anomaly cause 1 of the server. In the following, an example of the Bayesian statistics illustrated in FIG. 3 is also referred to as a Bayes (P1).

The control unit 10 determines a priority for each of the plurality of handling methods based on the restoration probability for each anomaly cause per apparatus type. The control unit 10 stores priorities of the handlings A1 to A4 estimated by the estimation model related to the Bayes (P1) in the case performance DB 114.

FIG. 4 is a diagram illustrating another example of calculation of a restoration probability by the Bayesian statistics.

The control unit 10 uses data in which each of a plurality of handling methods is associated with the number of cases of restoration for each anomaly cause per apparatus type to determine a restoration probability for each of the plurality of handling methods by the Bayesian statistics. In the example illustrated in FIG. 4, the control unit 10 considers the apparatus type, and determines the restoration probability for each of the plurality of handling methods for each anomaly cause. For example, as illustrated in FIG. 4, the control unit 10 separately determines the restoration probability for the handling A1 of the anomaly cause 1 of the router and the restoration probability for the handling A1 of the anomaly cause 1 of the server. Thus, the restoration probability for the handling A1 of the anomaly cause 1 of the router may be the same as or different from the restoration probability for the handling A1 of the anomaly cause 1 of the server. In the following, an example of the Bayesian statistics illustrated in FIG. 4 is also referred to as a Bayes (P2).

The control unit 10 determines a priority for each of the plurality of handling methods based on the restoration probability for each anomaly cause per apparatus type. The control unit 10 stores priorities of the handlings A1 to A4 estimated by the estimation model related to the Bayes (P2) in the case performance DB 114.

The case performance that is managed in the case performance DB 114 will be described.

FIG. 5 is a diagram illustrating an example of the case performance.

The case performance associates a plurality of handling methods, the number of cases of restoration, and a handling time per case of each of the plurality of handling methods with each other, for each anomaly cause per apparatus type. Furthermore, the case performance associates the plurality of handling methods and priorities of the plurality of handling methods estimated by the plurality of estimation models with each other, for each anomaly cause per apparatus type.

The "apparatus type" item stores each apparatus name (e.g., a router, or the like). The "anomaly cause" item stores each anomaly cause name (e.g., anomaly cause 1, or the like). The "handling" item stores a plurality of handling methods (e.g., handlings A1 to A4, or the like). The "number of cases of restoration" item stores the number of cases of restoration (e.g., 3 cases, or the like). The "handling time per case" item stores a handling time per case (e.g., 5 minutes, or the like) of a handling method associated with this. The "frequency statistics" item stores a priority of each of a plurality of handling methods estimated by an estimation model related to the frequency statistics (e.g., 2 associated with the handling A1, or the like). The "Bayes (P1)" item stores a priority of each of a plurality of handling methods estimated by an estimation model related to the Bayes (P1) (e.g., 1 associated with the handling A1, or the like). The "Bayes (P2)" item stores a priority of each of a plurality of handling methods estimated by an estimation model related to the Bayes (P2) (e.g., 4 associated with the handling A1, or the like).

The control unit 10 appropriately updates the case performance DB 114 as exemplified below. In response to update of the topology of the target network managed by the topology DB 111, the control unit 10 can update the apparatus type managed by the case performance DB 114. In response to update of information indicating the anomaly cause managed by the event DB 112, the control unit 10 can update the anomaly cause managed by the case performance DB 114. In response to restoration of an abnormal apparatus, the control unit 10 can update the number of cases of restoration managed by the case performance DB 114 with reference to the event DB 112. In response to update of the number of cases of restoration managed by the case performance DB 114, the control unit 10 can update the priorities of the plurality of handling methods estimated by each of the plurality of estimation models managed by the case performance DB 114. The plurality of handling methods may be predetermined or may be added or modified as appropriate.

The software configuration of the server 1 will be described.

Figure 6:
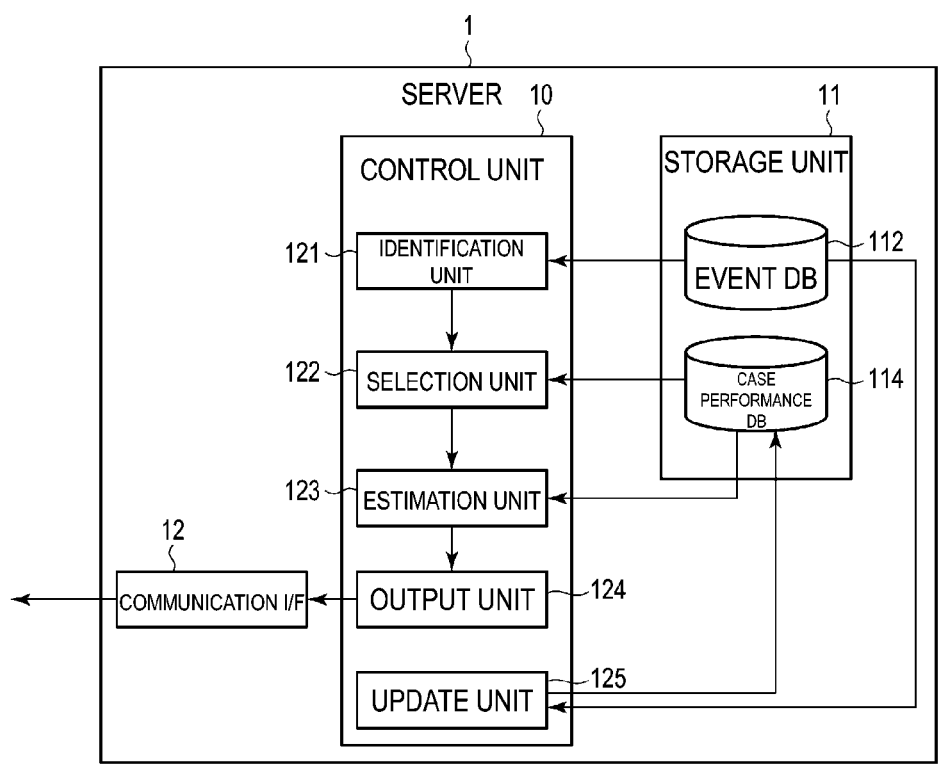
FIG. 6 is a block diagram illustrating a software configuration of the server used as the anomaly handling support apparatus according to the embodiment of the present invention.

FIG. 6 is a block diagram illustrating the software configuration of the server 1 used as the anomaly handling support apparatus according to the embodiment of the present invention. The control unit 10 runs an application program stored in the storage unit 11 to execute the identification unit 121, the selection unit 122, the estimation unit 123, the output unit 124, and the update unit 125.

The identification unit 121 identifies an abnormal apparatus in a plurality of apparatuses included in the target network. For example, the identification unit 121 refers to the event DB 112 to identify an abnormal apparatus in which an anomaly is currently occurring in the plurality of apparatuses. The identification unit 121 identifies an anomaly cause of the abnormal apparatus. For example, the identification unit 121 refers to the event DB 112 to identify the anomaly cause of the abnormal apparatus in which an anomaly is currently occurring.

The selection unit 122 selects an estimation model for estimating a handling method suitable for the anomaly cause from a plurality of estimation models, based on the case performance of the abnormal apparatus. For example, the selection unit 122 refers to the case performance DB 114 to select one estimation model from the plurality of estimation models, based on identification of the anomaly cause of the abnormal apparatus by the identification unit 121. A selection example of the estimation model by the selection unit 122 will be described below.

The estimation unit 123 estimates a handling method suitable for the anomaly cause among a plurality of handling methods, based on the estimation model selected by the selection unit 122. For example, the estimation unit 123 refers to the case performance DB 114 to estimate a handling method suitable for the anomaly cause, based on selection of the estimation model by the selection unit 122. In a typical example, the estimation unit 123 estimates a handling method with the highest priority among the priorities of the plurality of handling methods estimated by the estimation model selected by the selection unit 122.

The output unit 124 outputs information indicating the handling method estimated by the estimation unit 123. For example, the output unit 124 outputs an estimation result including the information indicating the handling method estimated by the estimation unit 123 to the terminal 2 via the communication I/F 12.

The update unit 125 updates the case performance of the abnormal apparatus based on restoration of the abnormal apparatus. For example, the update unit 125 updates the case performance of the abnormal apparatus managed by the case performance DB 114 such that the number of cases of restoration that has been associated with the handling method that has contributed to restoration of the abnormal apparatus is incremented by 1.

The update unit 125 updates the priorities of the plurality of handling methods estimated by the plurality of estimation models in the case performance of the abnormal apparatus managed by the case performance DB 114, based on the restoration of the abnormal apparatus as follows. In this example, the update unit 125 updates the number of cases of restoration in the case performance of the abnormal apparatus managed by the case performance DB 114 as described above. The control unit 10 determines a restoration probability of each of the plurality of handling methods for each anomaly cause per apparatus type, in each of the plurality of estimation models, based on the number of cases of restoration after the update. The control unit 10 determines priorities of the plurality of handling methods for each anomaly cause per apparatus type, in each of the plurality of estimation models, based on a restoration probability. An update example of the case performance by the update unit 125 will be described below.

Operation Example

An operation performed by the server 1 configured as described above will be described.

First, a selection example of an estimation model by the selection unit 122 of the server 1 will be described.

FIG. 7 is a diagram illustrating a selection example of an estimation model using the case performance illustrated in FIG. 5. Here, it is assumed that a router is an abnormal apparatus in which an anomaly is currently occurring, and that the anomaly cause of the router is an anomaly cause 1.

First, the selection unit 122 acquires a correct handling method included in a plurality of handling methods that has restored a past anomaly due to the same anomaly cause, the past anomaly having occurred before the current anomaly that is currently occurring in the abnormal apparatus due to the anomaly cause. For example, the past anomaly due to the same anomaly cause that occurred before the current anomaly is a past anomaly due to the same anomaly cause that occurred one anomaly before the current anomaly. For example, the selection unit 122 refers to the event DB 112 and acquires, as the correct handling method, a handling method that restored the past anomaly due to the anomaly cause 1 that occurred one anomaly before the current anomaly due to the anomaly cause 1 that is occurring in the router. Here, it is assumed that the handling A2 is the correct handling method.

Next, the selection unit 122 acquires the number of times of handling until completion of the correct handling method for each of a plurality of estimation models, based on priorities associated with handling methods corresponding to the correct handling method. The number of times of handling until completion of the correct handling method is the number of times of anomaly handling required from start of the anomaly handling associated with the highest priority to completion of the anomaly handling corresponding to the correct handling. The number of times of handling until completion of correct handling corresponds to the priority associated with the anomaly handling corresponding to the correct handling.

For example, the selection unit 122 acquires the number of times of handling of 3 until completion of the correct handling method for an estimation model related to the frequency statistics based on the priority of 3 associated with the handling A2 corresponding to the correct handling method. The selection unit 122 acquires the number of times of handling of 2 until completion of the correct handling method for an estimation model related to the Bayes (P1)

based on the priority of 2 associated with the handling A2 corresponding to the correct handling method. The selection unit 122 acquires the number of times of handling of 1 until completion of the correct handling method for an estimation model related to the Bayes (P2) based on the priority of 1 associated with the handling A2 corresponding to the correct handling method.

Next, the selection unit 122 acquires a handling time until completion of the correct handling method for each of the plurality of estimation models based on the sum of handling times, each of which is a handling time per one of one or more handling methods each having a priority the number of which is equal to or less than the number of the priority associated with the handling method corresponding to the correct handling method. The handling time until completion of the correct handling method is a total time required from start of the handling method associated with the highest priority to completion of the handling method corresponding to the correct handling method. The handling time until completion of the correct handling method is the sum of handling times, each of which is a handling time per one time of one or more handling methods each having a priority the number of which is equal to or less than the number of the priority associated with the handling method corresponding to the correct handling method.

For example, the selection unit 122 acquires a handling time (30 minutes) until completion of the correct handling method for the estimation model related to the frequency statistics based on the sum (10 minutes+5 minutes+15 minutes) of the handling times, each of which is a handling time per one time of handling methods having a priority the number of which is equal to or less than 3 which is the number of the priority associated with the handling A2 corresponding to the correct handling method. The selection unit 122 acquires a handling time (15 minutes) until completion of the correct handling method for the estimation model related to the Bayes (P1) based on the sum (10 minutes+5 minutes) of the handling times, each of which is a handling time per one time of handling methods having a priority the number of which is equal to or less than 2 which is the number of the priority associated with the handling A2 corresponding to the correct handling method. The selection unit 122 acquires a handling time (10 minutes) until completion of the correct handling method for the estimation model related to the Bayes (P2) based on the sum (10 minutes) of the handling times, each of which is a handling time per one time of handling methods having a priority the number of which is equal to or less than 1 which is the number of the priority associated with the handling A2 corresponding to the correct handling method.

Next, the selection unit 122 selects an estimation model for a handling method suitable for the anomaly cause from the plurality of estimation models based on the number of times of handling until completion of the correct handling method and the handling time until completion of the correct handling method. An estimation model with a fewer number of times of handling until completion of the correct handling method (close to zero) can be said to be an estimation model for a handling method suitable for the anomaly cause. An estimation model with a shorter handling time until completion of the correct handling method (close to 0) can be said to be an estimation model for a handling method suitable for the anomaly cause.

A typical example of evaluation of the number of times of handling until completion of the correct handling method and the handling time until completion of the correct handling method by the above-described selection unit 122 will be described.

In the typical example, the selection unit 122 normalizes the numbers of times of handling until completion of the correct handling method and the handling times until completion of the correct handling method for the plurality of estimation models. The selection unit 122 calculates a Euclidean distance from a coordinate to 0, the coordinate indicating a relationship between the normalized number of times of handling until completion of the correct handling method and the normalized handling time until completion of the correct handling method, for each of the plurality of estimation models. The selection unit 122 selects an estimation model having the shortest Euclidean distance.

Figure 8:
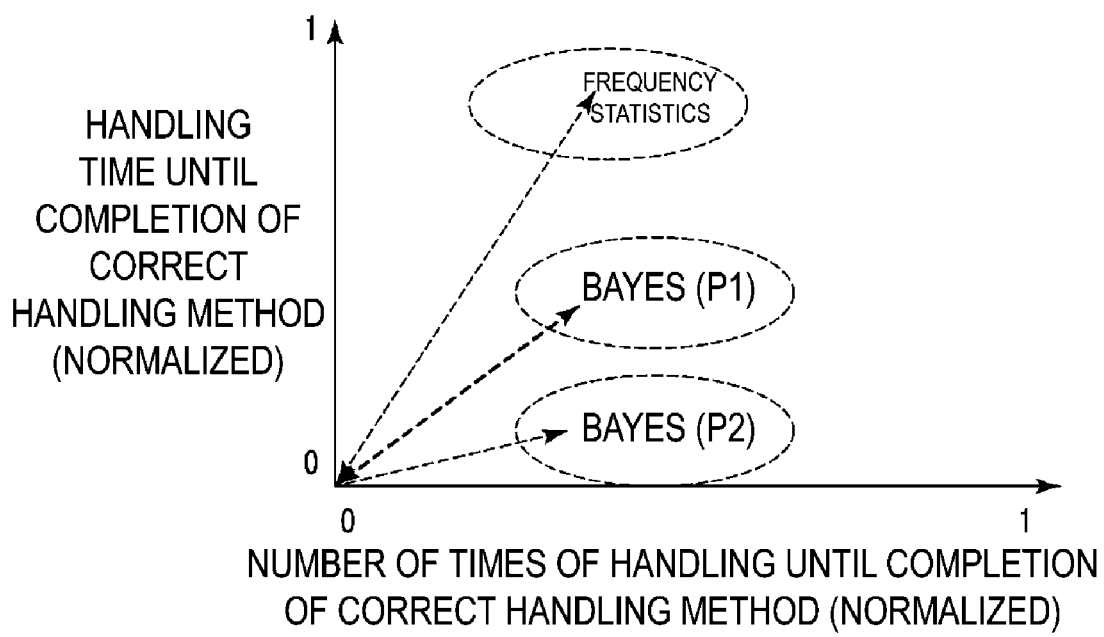
FIG. 8 is a diagram illustrating an example of calculation of a Euclidean distance based on the number of times of handling until completion of a correct handling method and a handling time until completion of the correct handling method.

FIG. 8 is a diagram illustrating an example of calculation of a Euclidean distance based on the number of times of handling until completion of the correct handling method and a handling time until completion of the correct handling method.

For example, the selection unit 122 normalizes the numbers of times of handling until completion of the correct handling method and the handling times until completion of the correct handling method for the estimation model related to the frequency statistics, the estimation model related to the Bayes (P1), and the estimation model for the Bayes (P2). The selection unit 122 uses a coordinate plane composed of a coordinate axis (horizontal axis) indicating the normalized number of times of handling until completion of the correct handling method and a coordinate axis (vertical axis) indicating the normalized handling time until completion of the correct handling method. The selection unit 122 identifies a coordinate indicating a relationship between the normalized number of times of handling until completion of the correct handling method and the normalized handling time until completion of the correct handling method for the estimation model related to the frequency statistics in the coordinate plane. Similarly, the selection unit 122 identifies a coordinate indicating a relationship between the normalized number of times of handling until completion of the correct handling method and the normalized handling time until completion of the correct handling method for the estimation model related to the Bayes (P1) in the coordinate plane. Similarly, the selection unit 122 identifies a coordinate indicating a relationship between the normalized number of times of handling until completion of the correct handling method and the normalized handling time until completion of the correct handling method for the estimation model related to the Bayes (P2) in the coordinate plane.

The selection unit 122 calculates a Euclidean distance from the coordinate associated with the estimation model related to the frequency statistics to 0 (origin) in the coordinate plane. Similarly, the selection unit 122 calculates a Euclidean distance from the coordinate associated with the estimation model related to the Bayes (P1) to 0 in the coordinate plane. Similarly, the selection unit 122 calculates a Euclidean distance from the coordinate associated with the estimation model related to the Bayes (P) to 0 in the coordinate plane.

The selection unit 122 selects an estimation model associated with a coordinate closest to 0 from the estimation model related to the frequency statistics, the estimation model related to the Bayes (P1), and the estimation model related to the Bayes (P2). The estimation model associated with the coordinate closest to 0 corresponds to the estimation model having the shortest Euclidean distance. Here, it is assumed that the selection unit 122 selects the estimation model related to the Bayes (P2).

Next, an estimation example of a handling method by the estimation unit 123 of the server 1 will be described.

With reference back to FIG. 7, the estimation unit 123 estimates the handling A2 having the highest priority among the priorities of the handlings A1 to A4 estimated by the estimation model related to the Bayes (P2) as a handling method suitable for the anomaly cause.

Next, an update example of the case performance by the update unit 125 of the server 1 will be described.

FIG. 9 is a diagram illustrating an example of update of the case performance illustrated in FIG. 5. Here, it is assumed that the router in which an anomaly occurred due to the anomaly cause 1 has been restored by application of the handling A2.

The update unit 125 updates the case performance of the router such that the number of cases of restoration associated with the handling A2 that has contributed to the restoration of the anomaly cause 1 is incremented by 1. The update unit 125 determines priorities of a plurality of handling methods by the estimation model related to the frequency statistics based on the updated number of cases of restoration. In a case where a change has occurred in the priorities of the plurality of handling methods, the update unit 125 updates the priorities in the case performance of the router. Similarly, the update unit 125 determines priorities of the plurality of handling methods by the estimation model related to the Bayes (P1) based on the updated number of cases of restoration. In a case where a change has occurred in the priorities of the plurality of handling methods, the update unit 125 updates the priorities in the case performance of the router. Similarly, the update unit 125 determines priorities of the plurality of handling methods by the estimation model related to the Bayes (P2) based on the updated number of cases of restoration. In a case where a change has occurred in the priorities of the plurality of handling methods, the update unit 125 updates the priorities in the case performance of the router.

Figure 10:
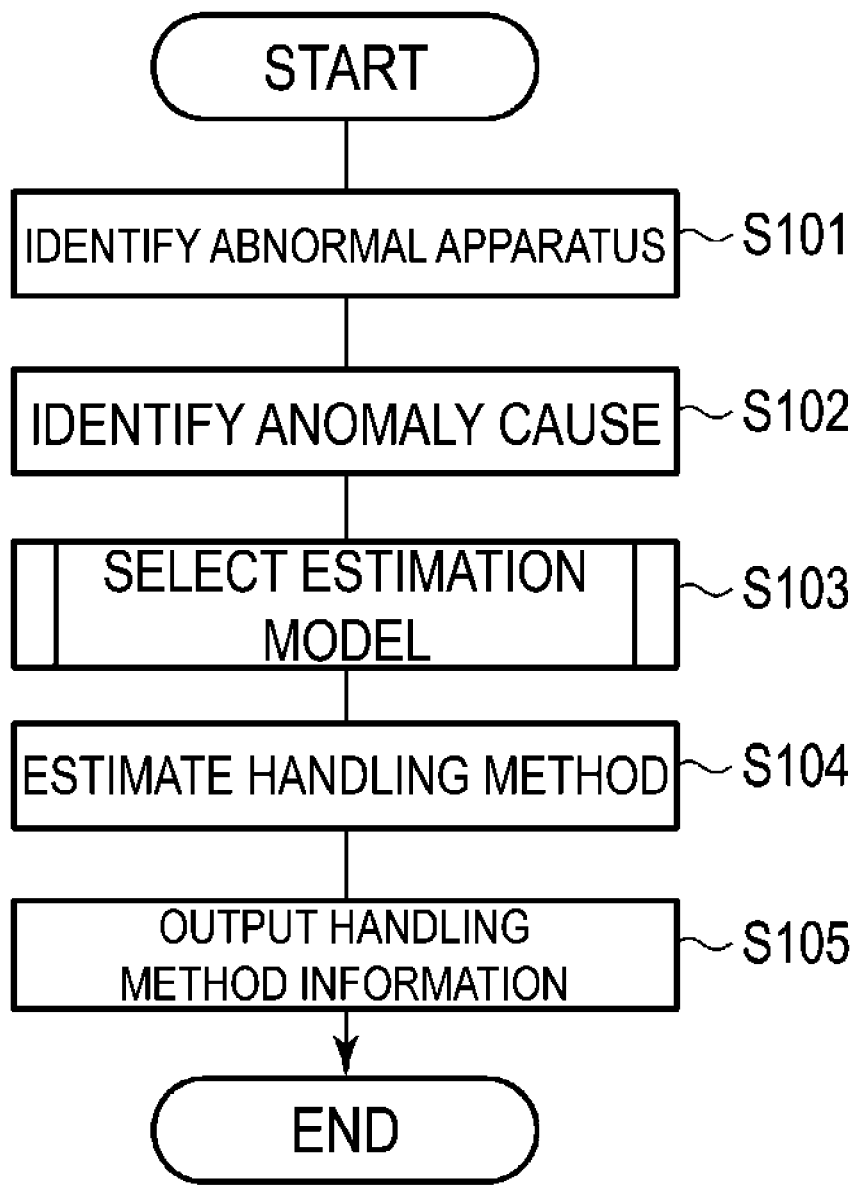
FIG. 10 is a flowchart illustrating a processing procedure and processing contents of presentation processing of a handling method suitable for an anomaly cause executed by the server illustrated in FIG. 6.

FIG. 10 is a flowchart illustrating a processing procedure and processing contents of presentation processing of a handling method suitable for an anomaly cause executed by the server 1.

The identification unit 121 identifies an abnormal apparatus in a plurality of apparatuses included in the target network (step S101). In step S101, for example, the identification unit 121 refers to the event DB 112 to identify an abnormal apparatus in which an anomaly is currently occurring in the plurality of apparatuses.

The identification unit 121 identifies an anomaly cause of the abnormal apparatus (step S102). In step S102, for example, the identification unit 121 refers to the event DB 112 to identify the anomaly cause of the abnormal apparatus in which an anomaly is currently occurring.

The selection unit 122 selects an estimation model for estimating a handling method suitable for the anomaly cause from a plurality of estimation models based on the case performance of the abnormal apparatus (step S103). In step S103, for example, based on identification of the anomaly cause of the abnormal apparatus by the identification unit 121, the selection unit 122 refers to the case performance DB 114 to select one estimation model from the plurality of estimation models.

The estimation unit 123 estimates a handling method suitable for the anomaly cause among the plurality of handling methods based on the estimation model selected by the selection unit 122 (step S104). In step S104, for example, based on selection of the estimation model by the selection unit 122, the estimation unit 123 refers to the case performance DB 114 to estimate a handling method suitable for the anomaly cause.

The output unit 124 outputs handling method information estimated by the estimation unit 123 (step S105). In step S105, for example, the output unit 124 outputs an estimation result including the handling method information estimated by the estimation unit 123 to the terminal 2 via the communication I/F 12.

Figure 11:
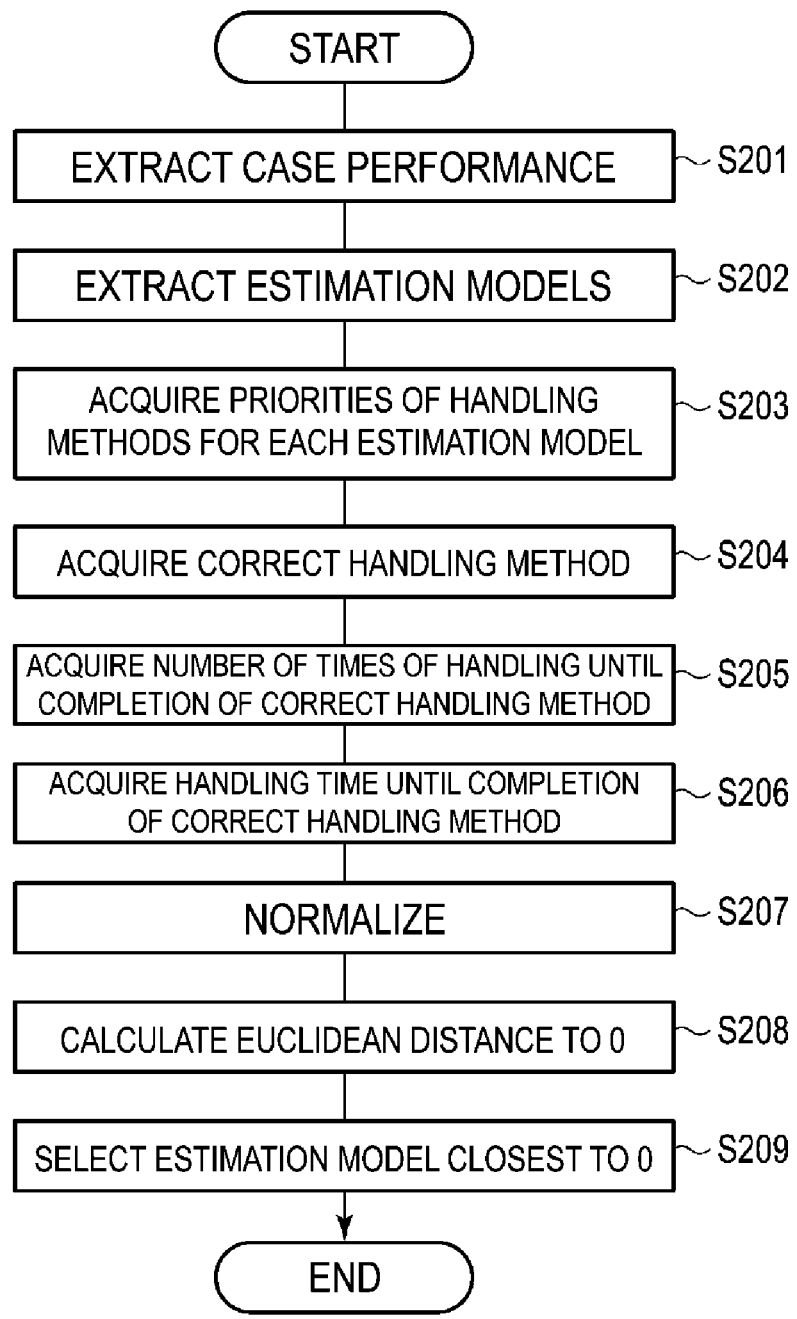
FIG. 11 is a flowchart illustrating a processing procedure and processing contents of selection processing of an estimation model illustrated in FIG. 10.

FIG. 11 is a flowchart illustrating a processing procedure and processing contents of selection processing of the estimation model in step S103 illustrated in FIG. 10.

The selection unit 122 refers to the case performance DB 114 to extract the case performance of the abnormal apparatus in which an anomaly is currently occurring (step S201).

The selection unit 122 refers to the estimation model DB 113 to extract a plurality of available estimation models (step S202). The selection unit 122 acquires priorities of the plurality of handling methods estimated by the plurality of available estimation models (step S203). In step S203, the selection unit 122 associates a plurality of handling methods with priorities of the plurality of handling methods estimated by the plurality of estimation models, for each anomaly cause in the case performance.

The selection unit 122 refers to the event DB 112 to acquire a correct handling method (step S204). The selection unit 122 acquires the number of times of handling until completion of the correct handling method for each of the plurality of estimation models based on the case performance and the correct handling method (step S205). The selection unit 122 acquires a handling time until completion of the correct handling method for each of the plurality of estimation models based on the case performance and the correct handling method (step S206).

The selection unit 122 normalizes the numbers of times of handling until completion of the correct handling method and the handling time until completion of the correct handling method for the plurality of estimation models (step S207). The selection unit 122 calculates a Euclidean distance from a coordinate to 0, the coordinate indicating a relationship between the normalized number of times of handling until completion of the correct handling method and the normalized handling time until completion of the correct handling method, for each of the plurality of estimation models (step S208). The selection unit 122 selects an estimation model associated with the coordinate closest to 0 in the coordinate plane (step S209).

Next, a case where the frequency statistics is effective and a case where the Bayesian statistics is effective will be described.

Figure 12:
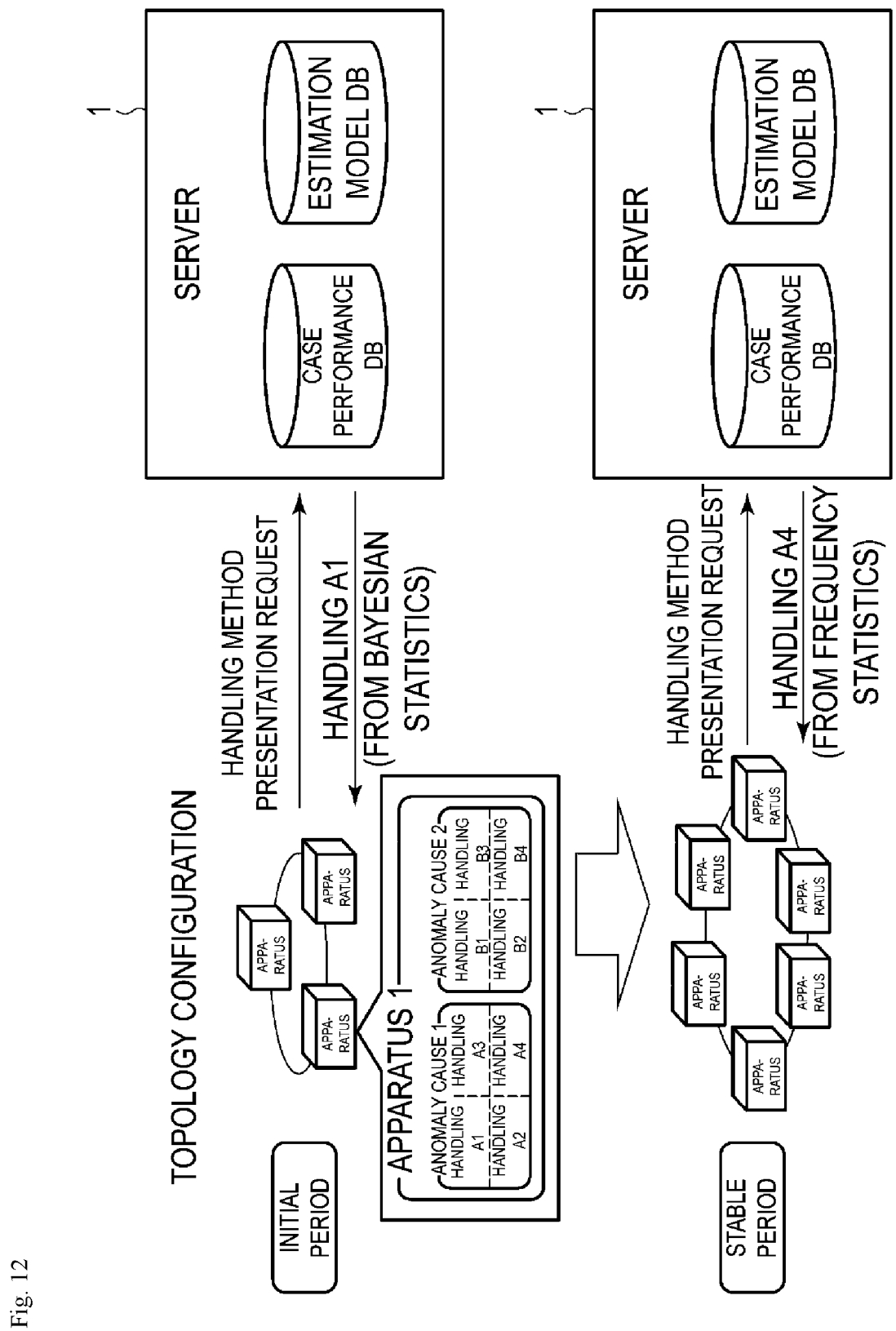
FIG. 12 is a diagram illustrating a case where the frequency statistics is effective and a case where the Bayesian statistics is effective.

FIG. 12 is a diagram illustrating a case where the frequency statistics is effective and a case where the Bayesian statistics is effective.

An estimation model to be employed is different between an initial period of the topology and a stable period of the topology. For example, the initial period of the topology is a period of time immediately after operation start of the topology, a period of time immediately after a change has occurred in the topology, or the like. For example, the stable period of the topology is a period of time after some time has passed since the topology started to be operated, a period of time after some time has passed since the topology changed, or the like.

In the initial period of the topology, it is preferable to use the estimation model related to the Bayesian statistics. This is because the number of cases of anomaly occurrence is small in the initial period of the topology. On the other hand, in the stable period of the topology, it is preferable to use the estimation model related to the frequency statistics. This is because many cases of anomaly occurrence are concentrated in the stable period of the topology.

FIG. 13 is a diagram illustrating a statistical model employed in accordance with the topology configuration.

In the initial period of the topology with one case of anomaly occurrence, an estimation model related to the Bayes (P1) is selected by the server 1. In this way, in the initial period of the topology, the estimation model related to the Bayes (P1) is superior to the estimation model related to the frequency statistics. This allows the server 1 to use the estimation model related to the Bayes (P1) to estimate a handling method suitable for the anomaly cause of the abnormal apparatus in the initial stage of the topology.

In the stable period of the topology with 75 cases of anomaly occurrence, the estimation model related to the frequency statistics is selected by server 1. In this way, in the stable period of the topology, the estimation model related to the frequency statistics is superior to the estimation model related to the Bayesian statistics. This allows the server 1 to use the estimation model related to the frequency statistics to estimate a handling method suitable for the anomaly cause of the abnormal apparatus in the stable period of the topology.

In the topology configuration having many apparatus types, the estimation model related to the frequency statistics or the estimation model related to the Bayes (P2) is selected by the server 1. Eight approach changes occur in such a case. When it is assumed that the running time that is lost by a single approach change is 1 hour, the effect of reduction of eight hours can be obtained.

Actions and Effects

As described above, in the embodiment, the server 1 can select an estimation model among a plurality of estimation models based on the case performance, and estimate a handling method suitable for an anomaly cause of the abnormal apparatus among a plurality of handling methods based on the selected estimation model.

As a result, the server 1 dynamically switches estimation models in accordance with the topology configuration based on the case performance, so that a handling method more suitable for the anomaly cause of the abnormal apparatus can be estimated. The server 1 can assist in anomaly handling of an abnormal apparatus by estimation of a more suitable handling method. As a result, the server 1 can realize reduction in time required for restoration of the abnormal apparatus and in maintenance operation.

Furthermore, the server 1 can estimate a handling method with the highest priority among priorities of a plurality of handling methods estimated by the selected estimation model, as a handling method suitable for the anomaly cause of the abnormal apparatus.

In this way, the server 1 can extract a handling method estimated as being most suitable for the anomaly cause of the abnormal apparatus by a dynamically selected estimation model.

Furthermore, the server 1 can select the estimation model based on the number of times of handling until completion of the correct handling method and the handling time until completion of the correct handling method.

As a result, the server 1 can select an appropriate estimation model by evaluating the number of times of handling until completion of the correct handling method and the handling time until completion of the correct handling method. For example, the server 1 can select, as an appropriate estimation model, an estimation model with a small number of times of handling until completion of the correct handling method and a short handling time until completion of the correct handling method.

Furthermore, the server 1 can select an estimation model having the shortest Euclidean distance from a coordinate to 0, the coordinate indicating a relationship between the normalized number of times of handling until completion of the correct handling method and the normalized handling time until completion of the correct handling method.

As a result, the server 1 can select an appropriate estimation model in consideration of both the number of times of handling until completion of the correct handling method and the handling time until completion of the correct handling method.

Furthermore, based on the case performance, the server 1 can select the estimation model among the estimation model related to the frequency statistics and the estimation model related to the Bayesian statistics.

This allows the server 1 to dynamically switch estimation models of different estimation techniques, such as an estimation model related to the frequency statistics and an estimation model related to Bayesian statistics, in accordance with the topology configuration based on the case performance.

Furthermore, based on restoration of the abnormal apparatus, the server 1 can update priorities of a plurality of handling methods estimated by the plurality of estimation models. This causes the server 1 to make the priorities of the plurality of handling methods estimated by the plurality of estimation models in a latest state, so that the priorities can be utilized for selection of an appropriate estimation model and estimation of an appropriate handling method.

In short, the present invention is not limited to the aforementioned embodiment and can be variously modified in the implementation stage without departing from the gist of the present invention. Also, the embodiments may appropriately be performed in combination as long as possible, and in such a case, combined effects can be obtained. Further, the aforementioned embodiment includes the invention in various stages, and various inventions can be extracted from appropriate combinations of a plurality of disclosed components.

REFERENCE SIGNS LIST

1 . . . Server
2 . . . Terminal
10 . . . Control unit
11 . . . Storage unit
12 . . . Communication I/F
111 . . . Topology DB
112 . . . Event DB
113 . . . Estimation model DB
114 . . . Case performance DB
121 . . . Identification unit
122 . . . Selection unit
123 . . . Estimation unit
124 . . . Output unit
125 . . . Update unit

The invention claimed is:
1. An anomaly handling support apparatus comprising:
a memory configured to store case performances on anomaly handling of a plurality of apparatuses; and
a hardware processor configured to perform:

identifying an anomaly cause of an abnormal apparatus in the plurality of apparatuses,
selecting an estimation model for estimating a handling method suitable for the anomaly cause from a plurality of estimation models based on a case performance of the abnormal apparatus, wherein the case performance of the abnormal apparatus associates, for the anomaly cause, a plurality of handling methods with priorities of the plurality of handling methods,
wherein selecting the estimation model comprises:
  acquiring a correct handling method included in the plurality of handling methods that has restored a past anomaly due to the anomaly cause, the past anomaly having occurred before a current anomaly that is occurring due to the anomaly cause in the abnormal apparatus,
  acquiring, for each of the plurality of estimation models, a number of times of handling until completion of the correct handling method based on a priority associated with a handling method corresponding to the correct handling method,
  acquiring, for each of the plurality of estimation models, a handling time until completion of the correct handling method based on a sum of handling times, each of the handling times being a handling time per one time of one or more handling methods each having a priority the number of which is equal to or less than the number of the priority associated with the handling method corresponding to the correct handling method, and
  selecting, based on the number of times of handling until completion of the correct handling method and the handling time until completion of the correct handling method, an estimation model for a handling method suitable for the anomaly cause from the plurality of estimation model,
estimating a handling method suitable for the anomaly cause among the plurality of handling methods based on the selected estimation model, and
outputting information indicating the estimated handling method.

2. The anomaly handling support apparatus according to claim 1, wherein
estimating the handling method suitable for the anomaly cause comprises estimating a handling method with a highest priority among the priorities of the plurality of handling methods estimated by the selected estimation model.

3. The anomaly handling support apparatus according to claim 2, further comprising updating the priorities of the plurality of handling methods estimated by the plurality of estimation models based on restoration of the abnormal apparatus.

4. The anomaly handling support apparatus according to claim 1, wherein
selecting the estimation model comprises:
normalizing the number of times of handling until completion of the correct handling method and handling times until completion of the correct handling method for the plurality of estimation models,
calculating Euclidean distances for the plurality of estimation models, each of the Euclidean distance being a distance from a coordinate to 0, the coordinate indicating a relationship between the normalized number of times of handling until completion of the correct handling method and the normalized handling time until completion of the correct handling method, and
selecting an estimation model having a shortest Euclidean distance as an estimation model for a handling method suitable for the anomaly cause.

5. The anomaly handling support apparatus according to claim 1, wherein the plurality of estimation models include at least an estimation model related to Bayesian statistics.

6. An anomaly handling support method performed by an anomaly handling support apparatus that includes a memory and a hardware processor, the anomaly handling support method comprising:
identifying an anomaly cause of an abnormal apparatus in a plurality of apparatuses;
selecting an estimation model for estimating a handling method suitable for the anomaly cause from a plurality of estimation models based on a case performance on anomaly handling of the abnormal apparatus, wherein the case performance of the abnormal apparatus associates, for the anomaly cause, a plurality of handling methods with priorities of the plurality of handling methods,
wherein selecting the estimation model comprises:
  acquiring a correct handling method included in the plurality of handling methods that has restored a past anomaly due to the anomaly cause, the past anomaly having occurred before a current anomaly that is occurring due to the anomaly cause in the abnormal apparatus,
  acquiring, for each of the plurality of estimation models, a number of times of handling until completion of the correct handling method based on a priority associated with a handling method corresponding to the correct handling method,
  acquiring, for each of the plurality of estimation models, a handling time until completion of the correct handling method based on a sum of handling times, each of the handling times being a handling time per one time of one or more handling methods each having a priority the number of which is equal to or less than the number of the priority associated with the handling method corresponding to the correct handling method, and
  selecting, based on the number of times of handling until completion of the correct handling method and the handling time until completion of the correct handling method, an estimation model for a handling method suitable for the anomaly cause from the plurality of estimation model;
estimating a handling method suitable for the anomaly cause among the plurality of handling methods based on the selected estimation model; and
outputting information indicating the estimated handling method.

7. The anomaly handling support method according to claim 6, wherein
estimating the handling method suitable for the anomaly cause comprises estimating a handling method with a highest priority among the priorities of the plurality of handling methods estimated by the selected estimation model.

8. The anomaly handling support method according to claim 7, further comprising updating the priorities of the plurality of handling methods estimated by the plurality of estimation models based on restoration of the abnormal apparatus.

9. The anomaly handling support method according to claim 6, wherein
selecting the estimation model comprises:

normalizing the number of times of handling until completion of the correct handling method and handling times until completion of the correct handling method for the plurality of estimation models, calculating Euclidean distances for the plurality of estimation models, each of the Euclidean distance being a distance from a coordinate to 0, the coordinate indicating a relationship between the normalized number of times of handling until completion of the correct handling method and the normalized handling time until completion of the correct handling method, and selecting an estimation model having a shortest Euclidean distance as an estimation model for a handling method suitable for the anomaly cause.

10. The anomaly handling support method according to claim 6, wherein the plurality of estimation models include at least an estimation model related to Bayesian statistics.

11. A non-transitory computer readable medium used in an anomaly handling support apparatus that includes a memory and a hardware processor, the non-transitory computer readable medium causing the hardware processor to perform:

identifying an anomaly cause of an abnormal apparatus in a plurality of apparatuses;

selecting an estimation model for estimating a handling method suitable for the anomaly cause from a plurality of estimation models based on a case performance on anomaly handling of the abnormal apparatus, wherein the case performance of the abnormal apparatus associates, for the anomaly cause, a plurality of handling methods with priorities of the plurality of handling methods, wherein selecting the estimation model comprises:

acquiring a correct handling method included in the plurality of handling methods that has restored a past anomaly due to the anomaly cause, the past anomaly having occurred before a current anomaly that is occurring due to the anomaly cause in the abnormal apparatus, acquiring, for each of the plurality of estimation models, a number of times of handling until completion of the correct handling method based on a priority associated with a handling method corresponding to the correct handling method, acquiring, for each of the plurality of estimation models, a handling time until completion of the correct handling method based on a sum of handling times, each of the handling times being a handling time per one time of one or more handling methods each having a priority the number of which is equal to or less than the number of the priority associated with the handling method corresponding to the correct handling method, and selecting, based on the number of times of handling until completion of the correct handling method and the handling time until completion of the correct handling method, an estimation model for a handling method suitable for the anomaly cause from the plurality of estimation model;

estimating a handling method suitable for the anomaly cause among the plurality of handling methods based on the selected estimation model; and outputting information indicating the estimated handling method.

12. The non-transitory computer readable medium according to claim 11, wherein estimating the handling method suitable for the anomaly cause comprises estimating a handling method with a highest priority among the priorities of the plurality of handling methods estimated by the selected estimation model.

13. The non-transitory computer readable medium according to claim 12, further comprising updating the priorities of the plurality of handling methods estimated by the plurality of estimation models based on restoration of the abnormal apparatus.

14. The non-transitory computer readable medium according to claim 11, wherein selecting the estimation model comprises:

normalizing the number of times of handling until completion of the correct handling method and handling times until completion of the correct handling method for the plurality of estimation models, calculating Euclidean distances for the plurality of estimation models, each of the Euclidean distance being a distance from a coordinate to 0, the coordinate indicating a relationship between the normalized number of times of handling until completion of the correct handling method and the normalized handling time until completion of the correct handling method, and selecting an estimation model having a shortest Euclidean distance as an estimation model for a handling method suitable for the anomaly cause.

15. The non-transitory computer readable medium according to claim 11, wherein the plurality of estimation models include at least an estimation model related to Bayesian statistics.

* * * * *